(12) United States Patent
Milley et al.

(10) Patent No.: US 9,255,826 B2
(45) Date of Patent: Feb. 9, 2016

(54) TEMPERATURE COMPENSATION MODULE FOR A FLUID FLOW TRANSDUCER

(71) Applicant: Honeywell International Inc., Morristown, NJ (US)

(72) Inventors: Andrew Joseph Milley, Hilliard, OH (US); Lamar Floyd Ricks, Lewis Center, OH (US); Craig Scott Becke, South Vienna, OH (US)

(73) Assignee: Honeywell International Inc., Morris Plains, NJ (US)

(*) Notice: Subject to any disclaimer, the term of this patent is extended or adjusted under 35 U.S.C. 154(b) by 259 days.

(21) Appl. No.: 13/943,551

(22) Filed: Jul. 16, 2013

(65) Prior Publication Data

US 2015/0020587 A1    Jan. 22, 2015

(51) Int. Cl.

| G01F 1/68 | (2006.01) |
|---|---|
| G01F 1/698 | (2006.01) |
| G01F 1/684 | (2006.01) |
| G01F 15/02 | (2006.01) |
| G01F 1/692 | (2006.01) |
| G01F 1/696 | (2006.01) |

(52) U.S. Cl.
CPC .............. *G01F 1/698* (2013.01); *G01F 1/6845* (2013.01); *G01F 1/692* (2013.01); *G01F 1/6965* (2013.01); *G01F 15/022* (2013.01)

(58) Field of Classification Search
CPC .................................. G01F 1/684; G01F 1/00
USPC ............ 73/204.15, 204.11, 204.16, 219, 861
See application file for complete search history.

(56) References Cited

U.S. PATENT DOCUMENTS

| 4,501,144 | A | * | 2/1985 | Higashi | G01F 1/698 73/204.26 |
|---|---|---|---|---|---|
| 4,914,742 | A | * | 4/1990 | Higashi | G01F 1/6845 257/467 |
| 5,050,429 | A | * | 9/1991 | Nishimoto | G01P 5/12 73/195 |
| 5,600,174 | A | * | 2/1997 | Reay | G01F 1/6845 257/401 |
| 6,134,960 | A | * | 10/2000 | Yamakawa | G01F 1/699 73/204.26 |
| 6,752,014 | B1 | * | 6/2004 | Kanke | G01F 1/6845 73/204.15 |
| 6,813,944 | B2 | * | 11/2004 | Mayer | G01F 1/6847 73/204.26 |
| 6,871,538 | B2 | * | 3/2005 | Fujiwara | G01F 1/6965 73/204.26 |
| 7,154,372 | B2 | * | 12/2006 | Vanha | G01F 15/10 338/22 SD |

(Continued)

OTHER PUBLICATIONS

Hitachi, Thermal type flow rate measuring apparatus, EP 1376073.*

*Primary Examiner* — Lisa Caputo
*Assistant Examiner* — Nigel Plumb
(74) *Attorney, Agent, or Firm* — Conley Rose, P.C.; Kristin Jordan Harkins

(57) ABSTRACT

Apparatus and associated methods relate to a temperature-compensated drive for a heating element used in a microbridge flow sensor. In some embodiments, the heating element may be located substantially between two temperature sensors. The two temperature sensors may be convectively coupled to the heater by a fluid ambient. When the fluid ambient is flowing, one of the temperature sensors may be upstream of the heating element, and one of the temperature sensors may be downstream. The fluid may be heated by the heating unit, and this heated fluid may then flow past the downstream temperature sensor. The two temperature sensors may be used in a Wheatstone bridge configuration. In some embodiments, an output signal of the Wheatstone bridge may be indicative of a measure of fluid flow. The temperature-compensated drive for the heating element may enhance, for example, the flow meter's disturbance rejection of ambient temperature.

20 Claims, 7 Drawing Sheets

(56) References Cited

U.S. PATENT DOCUMENTS

| | | | |
|---|---|---|---|
| 7,490,511 B2* | 2/2009 | Mayer | G01F 1/6845 73/204.15 |
| 2007/0209433 A1* | 9/2007 | Gehman | G01F 1/692 73/204.26 |
| 2010/0154532 A1* | 6/2010 | Becke | G01F 1/6845 73/170.12 |
| 2012/0192642 A1* | 8/2012 | Speldrich | G01F 5/00 73/204.11 |
| 2012/0192643 A1 | 8/2012 | Speldrich et al. | |
| 2012/0286872 A1* | 11/2012 | Rozgo | G01D 18/004 330/279 |
| 2013/0055821 A1* | 3/2013 | Bentley | G01L 9/0054 73/721 |
| 2013/0055826 A1* | 3/2013 | Qasimi | G01F 1/6845 73/861.02 |
| 2013/0098484 A1* | 4/2013 | Speldrich | F17D 1/00 137/599.01 |
| 2013/0098486 A1 | 4/2013 | Speldrich et al. | |
| 2013/0139584 A1 | 6/2013 | Qasimi et al. | |

* cited by examiner

TEMPERATURE COMPENSATION MODULE FOR A FLUID FLOW TRANSDUCER

TECHNICAL FIELD

Various embodiments relate generally to fluid flow transducers.

BACKGROUND

Fluid flow transducers are widely used to measure the flow of fluid materials. Gas flow transducers are used throughout the microelectronics industry, for example. The measurement and control of gas flows must be very precise in this industry. The vacuum technology used in the microelectronics industry requires small but precise gas flows. These small flows permit a flow meter to be located inside a gas delivery tube. Other industries require large gas consumptions. In such industries, a small fraction of the delivered gas may be routed through a bypass tube. The gas flow is often measured in this bypass tube, and the measured flow is then multiplied by the ratio of total gas flow to the gas flowing in the bypass tube. Fluid flow transducers are also used to measure the flow of liquid commodities. For example, chemical companies use fluid flow transducers to measure the flow of liquid reactants used in a chemical reaction. The precise measure of the flows of multiple reactants may be critical for maintaining a proper stoichiometric ratio for a reaction.

Many disturbances can make precise flow measurement difficult to realize. Noise in power supplies can deleteriously affect the measurement result of a fluid flow transducer, for example. Chemical reactions between a flowing commodity and a fluid flow transducer may degrade the measurement precision of the instrument. Different chemical compositions having the same flow rates may produce different measurement results in many fluid flow transducers. Even identical chemical compositions at identical flow rates may produce different measurement results if the temperatures of the chemical compositions differ.

SUMMARY

Apparatus and associated methods relate to a temperature-compensating drive for a heating element used in a fluid flow transducer. In some embodiments, a temperature-compensating drive circuit may be coupled to a heating element located substantially between two temperature sensors on a Micro Electromechanical Systems (MEMS) die. The two temperature sensors may be convectively coupled to the heating element by a fluid ambient. When the fluid ambient is flowing, one of the temperature sensors may be upstream of the heating element, and one of the temperature sensors may be downstream. The fluid may be heated by the heating unit, and this heated fluid may then flow past the downstream temperature sensor. In some embodiments, output signals from the two temperature sensors may be indicative of a measure of fluid flow. The temperature-compensated drive for the heating element may enhance, for example, the flow meter's disturbance rejection of ambient temperature.

Various embodiments may achieve one or more advantages. For example, some embodiments may permit a Micro ElectroMechanical Systems (MEMS) die to perform flow measurements with sufficient precision so that subsequent off-chip signal processing may not be required to correct for signal disturbances. In some embodiments, the flow transducer may be smaller as a result of the disturbance correction circuitry. This small sized transducer may enable a fluid flow transducer to be located in a very small fluid tube, for example. In some embodiments, the small fluid flow device may accurately measure very small fluid flows. In an exemplary embodiment the use of a temperature-compensating module may permit the simplification of fluid flow device calibration, for example, by removing the need for changing the ambient temperature of the system.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 4:
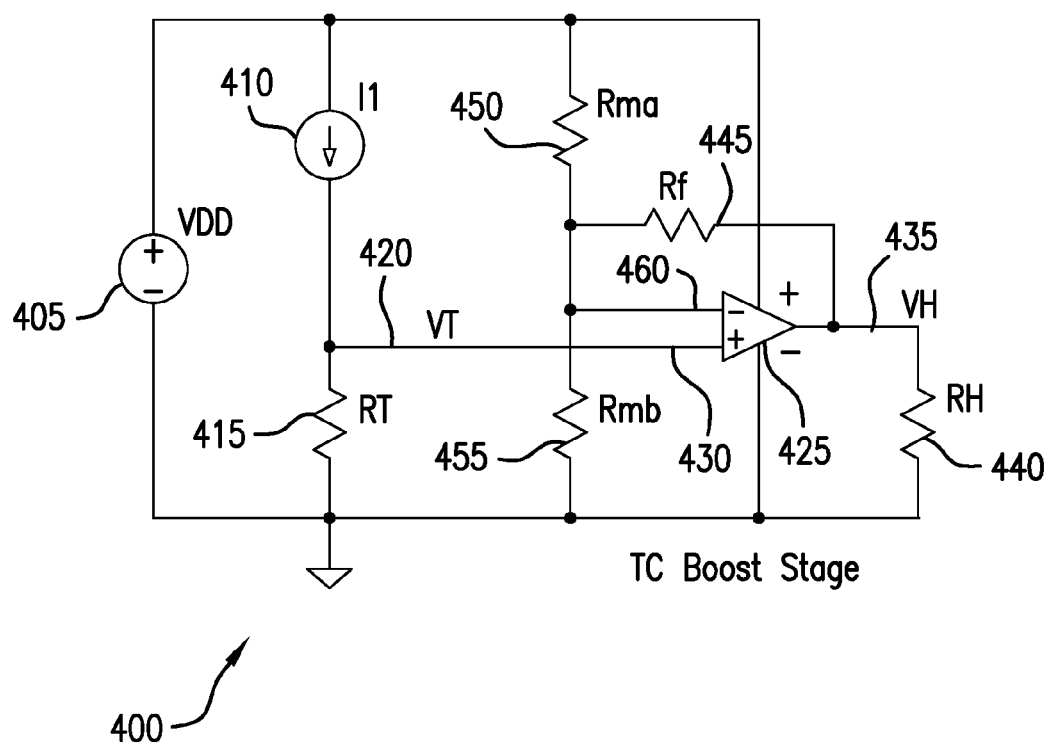
FIG. 4 depicts a circuit schematic of an exemplary heating-element drive circuit of a fluid flow transducer.
Figure 5:
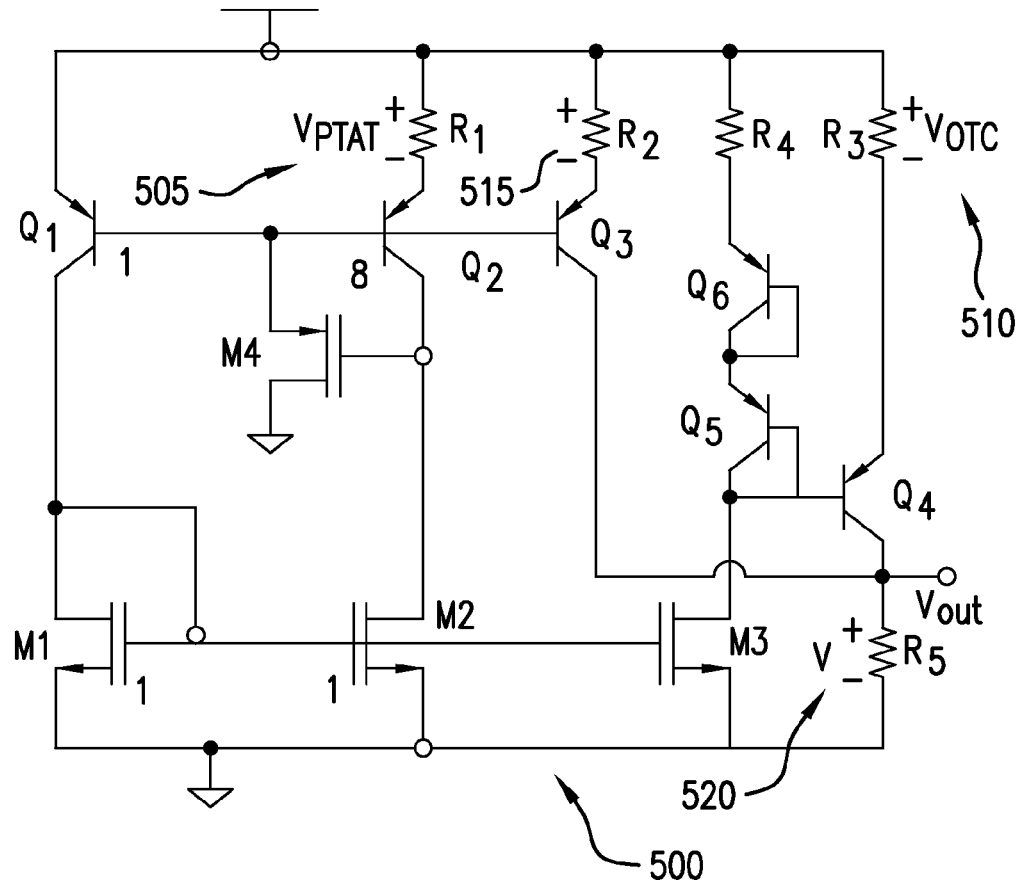
FIG. 5 depicts a circuit schematic of an exemplary Temperature-Compensation Module (TCM) for a heating element drive of a fluid flow transducer.
Figure 5:
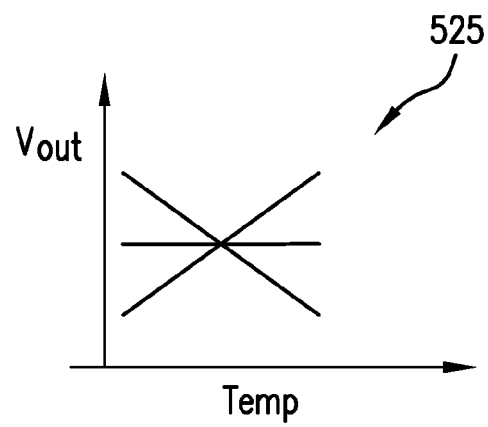

To aid understanding, this document is organized as follows. First, a field application of an exemplary temperature-compensated fluid flow transducer is detailed with reference to FIG. 1. Second, with reference to FIGS. 2A-3B, the discussion turns to exemplary embodiments that illustrate the relationships of various modules with respect to one another. Specifically experimental results will be detailed with reference to FIGS. 2B-2C. With reference to FIGS. 4-5, exemplary embodiments of TCMs will be detailed. Finally, with reference to FIG. 6, further explanatory discussion will revolve around calibration and testing of an exemplary temperature-compensated drive for a fluid flow transducer.

Figure 1:
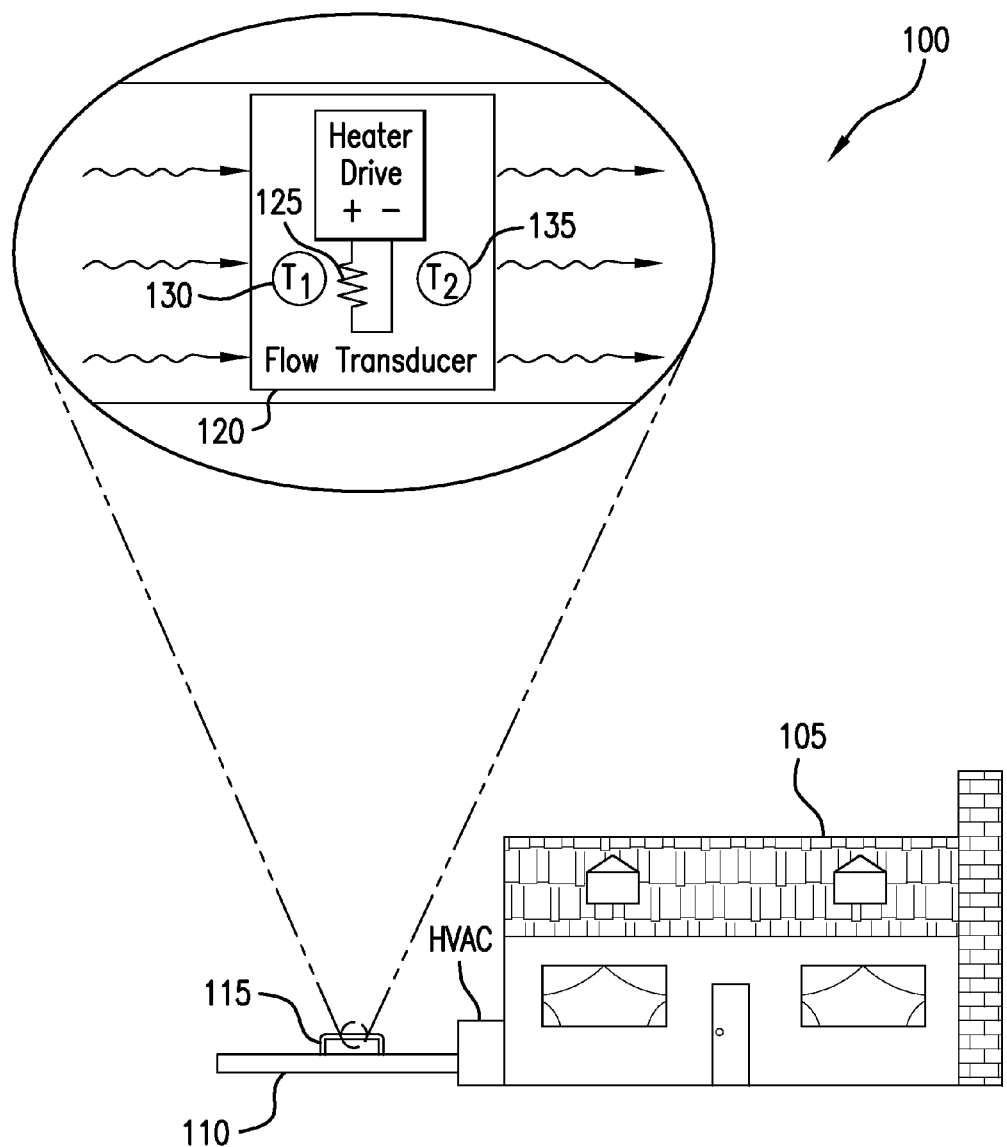
FIG. 1 depicts a field application of an exemplary fluid flow transducer having a temperature-compensation module.

FIG. 1 depicts a field application of an exemplary fluid flow transducer having a temperature-compensation module. In this figure, a facility 100 includes a factory 105 supplied with natural gas via a pipeline 110. A bypass tube 115 is used in this example to shunt a small portion of the supplied gas from the pipeline 110. Within the bypass tube 115, an exemplary fluid flow transducer 120 is located. The fluid flow transducer 120 has a heating element 125 located between two temperature sensors 130, 135. An upstream temperature sensor 130 is in thermal conduction with the natural gas that is flowing within the bypass tube 115. The heating element 125 and the downstream temperature sensor 135 are similarly in thermal conduction with the natural gas in the bypass tube 115. The natural gas may be heated by the heating element 125 as it passes in close proximity to it. The heated natural gas then may flow past the downstream temperature sensor 135. The upstream temperature sensor 130 may register a lower natural gas temperature than the downstream temperature sensor 135, as the heated natural gas flows away from the upstream temperature sensor 130 and toward the downstream temperature sensor 135. The pipeline 110 is located outside of the factory 105. Because the pipeline 110 is located outdoors, the temperature of the gas may fluctuate daily and seasonally, for example.

Figure 2A:
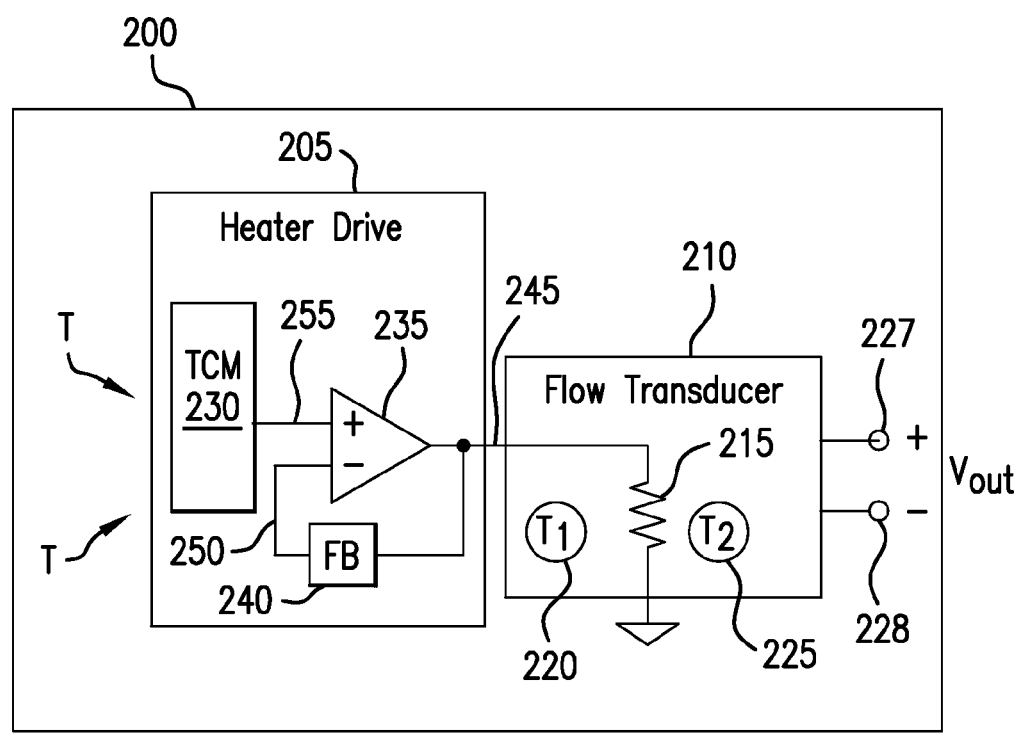
FIGS. 2A-2C depict a block diagram of an exemplary temperature-compensated fluid flow transducer and graphs showing experimental results for an exemplary temperature-compensation module.
Figure 2B:
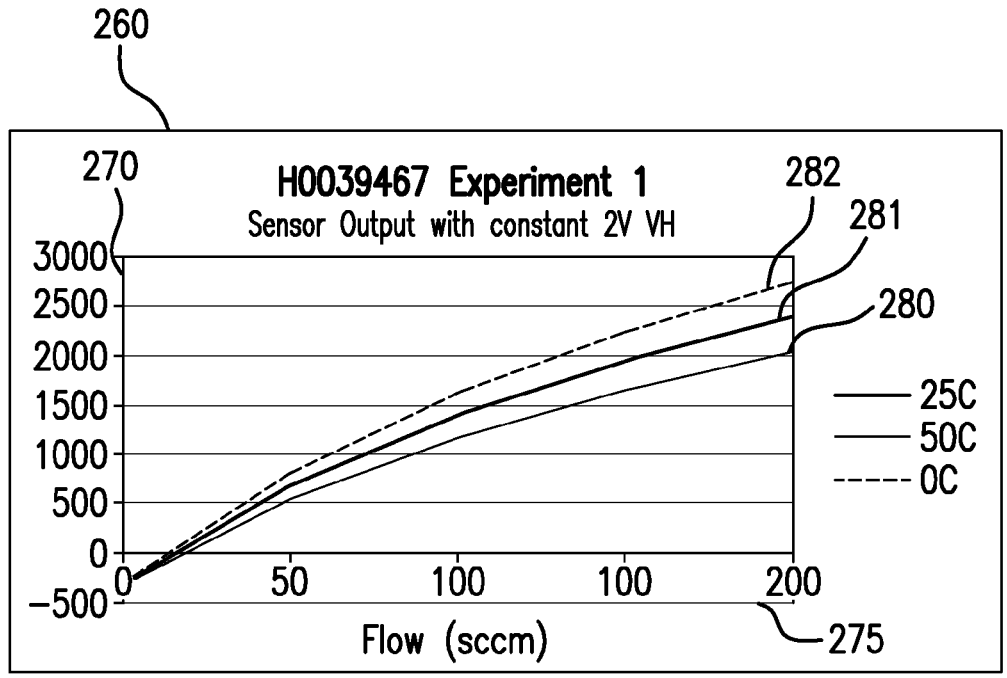
Figure 2C:
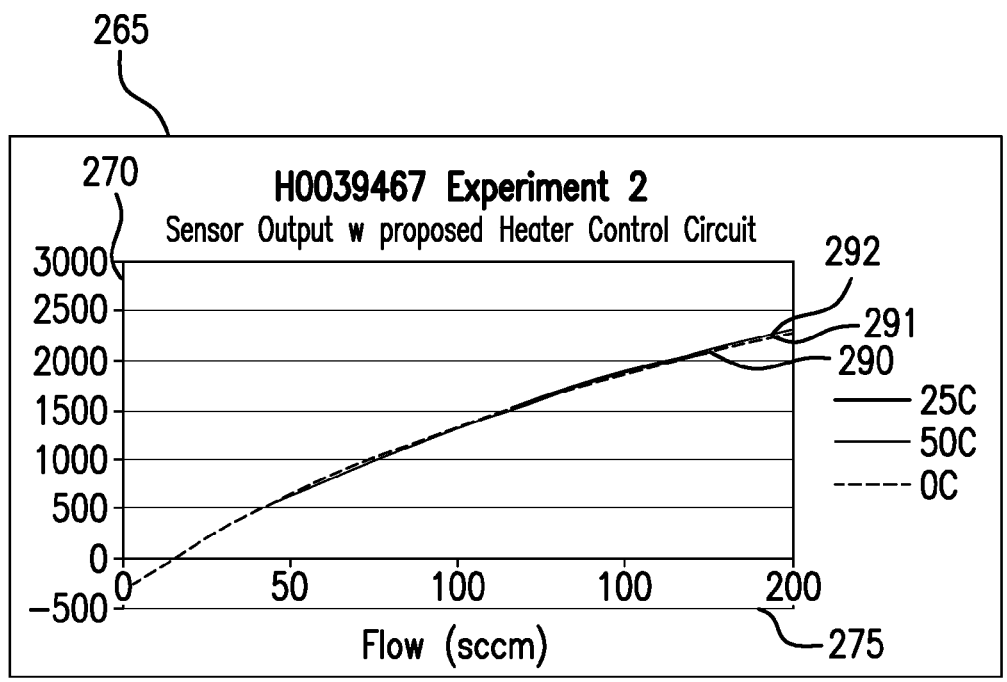

FIGS. 2A-2C depict a block diagram of an exemplary temperature-compensated fluid flow transducer and graphs showing experimental results for an exemplary temperature-compensation module. In this figure, an exemplary temperature-compensated fluid flow measurement system 200 is depicted. The fluid flow measurement system 200 includes a heater drive circuit 205 and a fluid flow transducer 210. The flow transducer 210 has a heater 215 located between a first temperature sensor 220 and a second temperature sensor 225. Power for the heater 215 is supplied by a heater drive circuit 205. When a flow transducer 210 is introduced into a fluid material, such as a gas or liquid material, the heater 215 may be in thermal conduction with the fluid material. In some embodiments the fluid material may substantially surround the heater 215. In some embodiments the fluid material may pass directly over the heater 215. When the flow transducer is introduced into a fluid material, the temperature sensors 220, 225 may be in thermal communication with the fluid material. In this way, the temperature sensors 220, 225 may be in convective connection with the heater 215. The measurements of the temperature sensors 220, 225 may be indicative of a flow of the fluid material. The flow transducer 210 may put a signal indicative of a flow of the fluid material on one or more output pins 227, 228.

The heater drive circuit 205 includes a temperature-compensation module 230, an amplifier 235 and a feedback network 240. In some embodiments, the amplifier 235 may have a gain greater than one. In some embodiments the amplifier's gain may be less than or equal to one. The amplifier 235 has an output node 245 which is connected to the heater 215 of the flow transducer 210. The feedback network 240 samples a signal on the output node 245 and may perform signal processing operations to the signal, such as may be performed by passive impedance networks, in some embodiments. The processed output signal is then delivered to a negative input node 250 of the amplifier 235 in this example.

The Temperature-Compensation Module (TCM) 230 may generate a temperature-varying signal and then may deliver this temperature-varying signal to the positive input node 255 of the amplifier 235. The temperature-varying signal may be used to compensate for a disturbance due to the temperature variation of the fluid material. A temperature profile of the temperature-varying signal may be predetermined in some embodiments. In an exemplary embodiment, the temperature profile may be programmable. In various embodiments the temperature profile may be trimmable, for example.

In FIGS. 2B-2C, experimental results of the signal indicative of the flow of a fluid material are shown 260, 265. The experimental results 260 display the signal indicative of fluid flow on a y-axis 270 vs. an actual fluid flow on an x-axis 275. The experiment results 260 correspond to a series of three tests, in which the heater drive circuit was replaced by a fixed 2.0 V voltage source. Thus, the heater 215 of the flow transducer 210 was biased by a 2 V source independent of the temperature of the fluid material. The bottom result line 280 shows the relation between actual fluid flow and output signal for a fluid material which had a 50° C. temperature. The middle result line 281 shows the relation between actual fluid flow and output signal for the same fluid material but at a 25° C. temperature. And the top result line 282 shows the relation between actual fluid flow and output signal for the same fluid material but at 0° C. temperature. The disturbance due to temperature of the fluid material of the flow transducer may be represented by the difference between the result lines 280, 281, 282.

The experimental results 265 display the signal indicative of fluid flow on a y-axis 270 vs. an actual fluid flow on an x-axis 275. The experiment results 265 correspond to a series of three tests, in which the heater drive circuit 205 with its TCM 230 is connected to the flow transducer 210. Thus, the heater 215 of the flow transducer 210 was biased by a predetermined temperature-varying signal created by the TCM 230. The temperature-varying signal was based upon the temperature of the temperature-compensated fluid flow measurement system 200. Three result lines 290, 291, 292 are practically indistinguishable in the experimental results 265. The identical experiments shown in the experimental results 260 above were repeated in the experimental results 265, but with the system configured with the heater drive circuit 205 connected to the flow transducer 210. The three result lines 290, 291, 292 show the relation between actual fluid flow and output signal for the same fluid material but at the following three temperatures: 0° C., 25° C., and 50° C. The residual error due to the temperature disturbance of the fluid material may be represented by the difference between the result lines 290, 291, 292. This experiment demonstrates the improvement in disturbance rejection that may be achieved using a TCM 230.

Figure 3A:
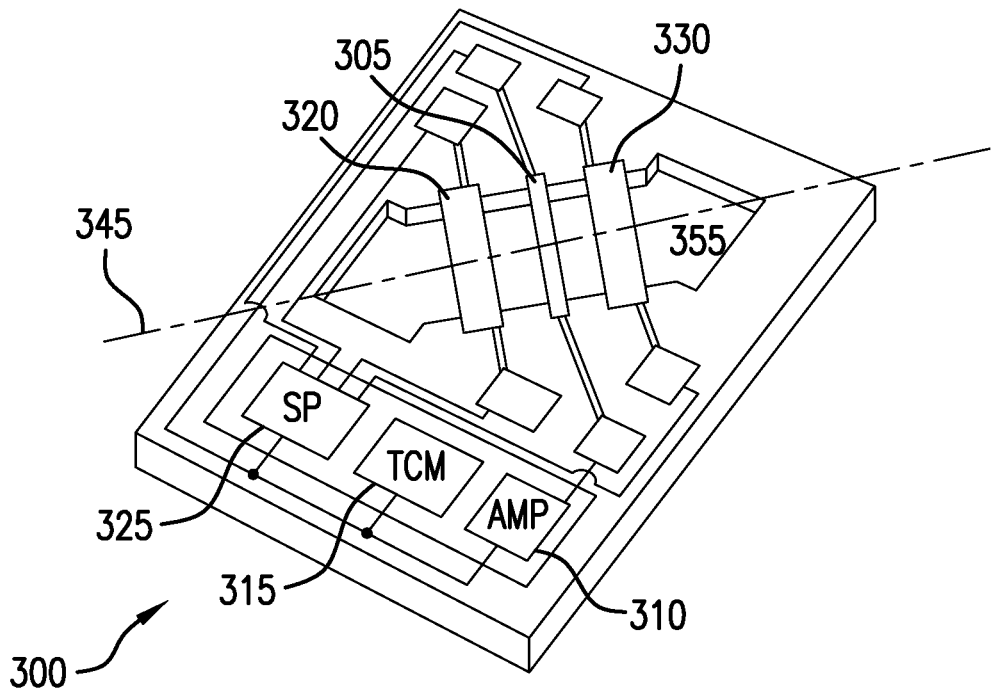
FIGS. 3A-3B depict perspective and cross-sectional views of an exemplary Micro ElectroMechanical Systems (MEMS) based fluid flow transducer.
Figure 3B:
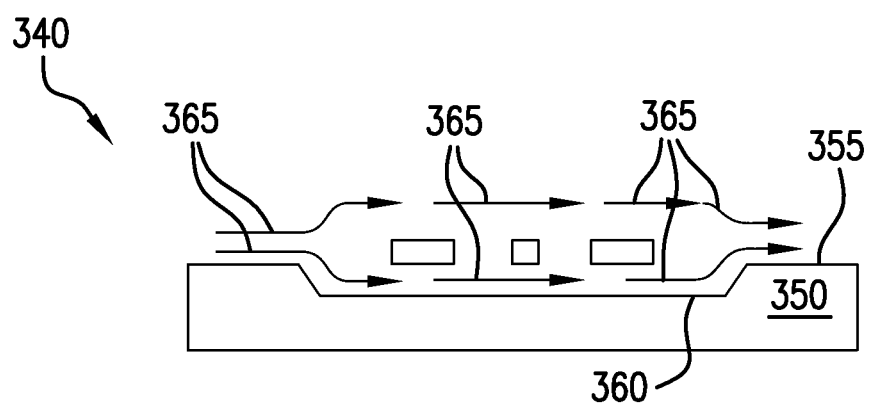

FIGS. 3A-3B depict perspective and cross-sectional views of an exemplary Micro ElectroMechanical Systems (MEMS) based fluid flow transducer. In this figure, a perspective view of an exemplary MEMS based fluid flow transducer with temperature-compensation 300 is shown. A heating element 305 is depicted in this example. The heating element is connected to an amplifier 310, which in turn is connected to a TCM 315. A first temperature sensor 320 is connected to a signal processing circuit 325. A second temperature sensor 330 is connected to the signal processing circuit 325 as well. The heating element 305, first temperature sensor 320 and second temperature sensor 330 all span an etched canyon 355 in the MEMS based device 300.

FIG. 3B depicts the exemplary MEMS based fluid flow transducer with temperature-compensation from a cross-sectional view 340. The cross-section is taken along the line 345 indicated in the perspective view 300. A MEMS die 350 is shown having a top surface 355. An etched canyon 360 permits the fluid ambient material to substantially flow around the heating element 305 and two temperature sensors 320, 330, as indicated by the flow lines 365. The cross-sectional view 340 may assist one to visualize that the heating element 305 and temperature sensors 320, 330 may be in thermal conduction with the fluid ambient material. The indicated flow lines 365 define the first temperature sensor 320 as the upstream temperature sensor, because the fluid material encounters the first temperature sensor 320 before encountering the heating element 305 of the second temperature sensor 330. Similarly, the flow lines 365 define the second temperature sensor 330 as the downstream temperature sensor, because the fluid material encounter the second temperature sensor 330 after encountering the first temperature sensor 320 and the heater 305. The heating element 305 may be in thermal contact with the fluid material, and the fluid material may become hot in the region around the heating element 305. This heated fluid material may then flow in the direction indicated by the flow lines 365. The heated fluid material may then subsequent to heating be located nearby the downstream temperature sensor 330. The downstream temperature sensor 330 may then indicate a higher temperature reading than that indicated by the upstream temperature sensor 320 for a flow in the direction of the flow lines 365. Conversely, if the first temperature sensor 320 registers a higher fluid material temperature than the second temperature sensor 330, this may indicate a fluid flow of the opposite direction of the flow lines 365.

FIG. 4 depicts a circuit schematic of an exemplary heating-element drive circuit of a fluid flow transducer. In this figure, an exemplary heating-element drive circuit 400 has power source 405 supplying power to the circuitry. The TCM includes a current source 410 and a resistor 415. In some embodiments, the resistor 415 may have a large temperature coefficient of resistance. In one exemplary embodiment, thin-film platinum resistors may be used. In some embodiments, silicon based diffused resistors may be used. In some embodiments, the current source 410 may be a constant current source. In various embodiments, the current source may be replaced with a resistor having a different temperature coefficient of resistance than that of the resistor 415. If, for example, a constant current source is directed through a resistor with a large temperature coefficient of resistance, a temperature-varying voltage may be produced. If a resistor has a different temperature coefficient of resistance than resistor 415, then the resulting resistor divider may produce a temperature varying voltage at their shared node. This temperature-varying voltage may be predetermined to compensate for any disturbances based upon a temperature that the system may experience. The temperature-varying voltage of a TCM output node 420 communicates the temperature varying signal to an amplifier 425.

In this figure, the amplifier 425 receives the temperature-varying signal at the positive input node 430 of the amplifier 425. The output signal of the amplifier 425 is presented on the output node 435 of the amplifier, and provides the drive bias for the heater 440. A feedback network, in this exemplary embodiment, consists of three resistors 445, 450, 455. The RF resistor 445 provides a feedback path from the output of the amplifier to the negative input node 460. The gain and offset of the amplifier may be adjusted by varying the three resistors 445, 450, 455, in this example.

FIG. 5 depicts a circuit schematic of an exemplary Temperature-Compensation Module (TCM) for a heating element drive of a fluid flow transducer. In the FIG. 5 embodiment, a band-gap reference 500 is depicted. Here, the band-gap reference 500 establishes a voltage 505 (across R1) which is Proportional To Absolute Temperature (PTAT). This band-gap reference 500 also sets up a voltage 510 (across R3) that is independent of temperature (OTC). By combining a mirrored copy of the PTAT signal 515 (across R2) and the OTC signal 510 (across R3), a voltage 520 (across R5) of arbitrary temperature profile can be produced. The weight of the PTAT signal can be determined by the selection of the resistor R2. And the weight of the OTC signal can be determined by the selection of the resistor R3. Thus, a wide range of predetermined temperature profiles may be obtained from such a band-gap reference 500. In some examples, the weight of the PTAT component may be programmable using a DAC. In some embodiments, the weight of the OTC component may be programmable using a DAC. In this way, the temperature profile of the TCM may be made programmable. In some embodiments, one or more of the resistors used in the band-gap reference 500 may be of the same type as that used by the heating element of the fluid flow transducer. In this figure, an exemplary graph 525 depicts various voltage profiles versus temperature that may be achieved using such a reference, for example.

Figure 6:
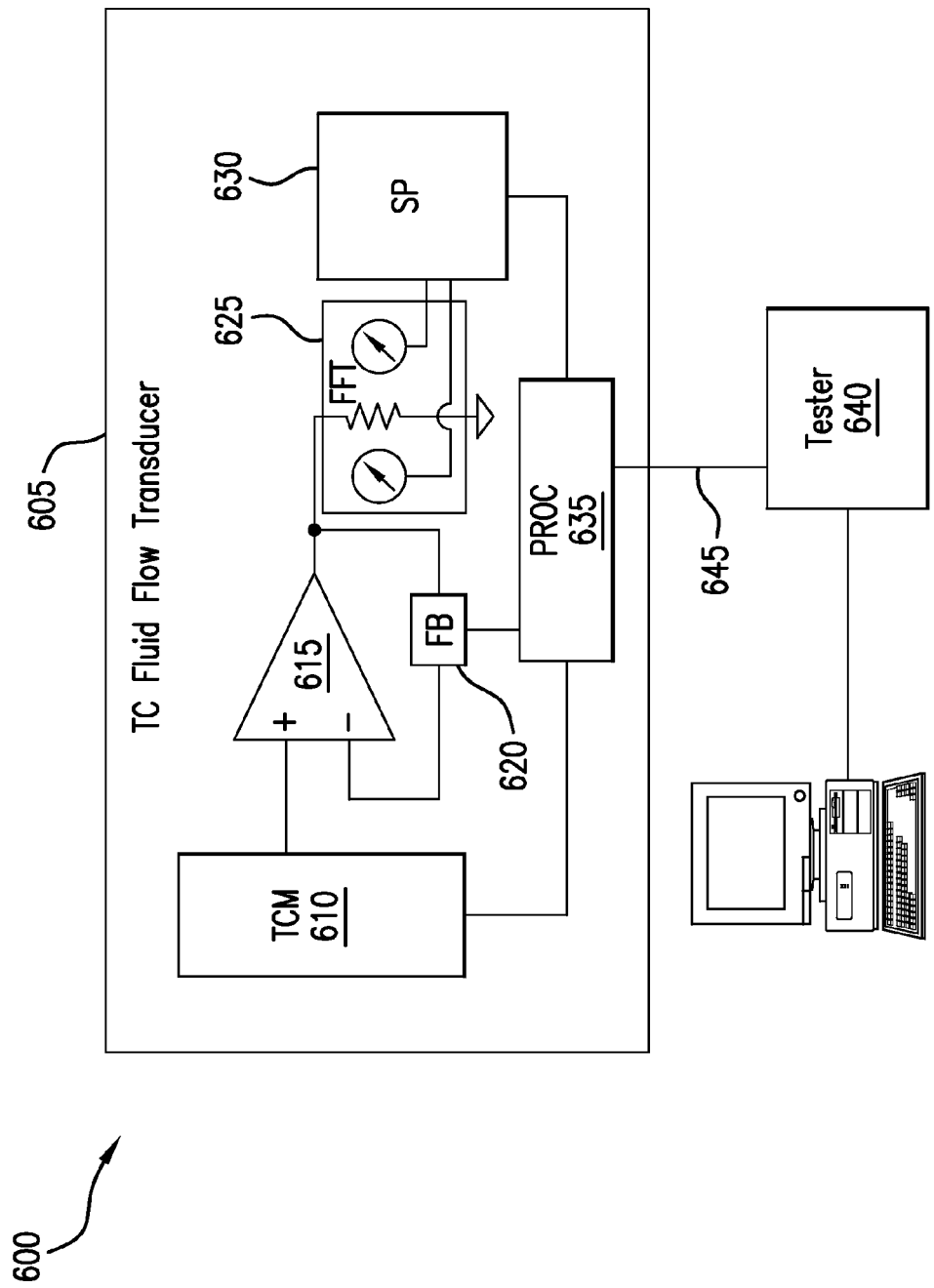
FIG. 6 depicts a block diagram of a calibration station connected to an exemplary temperature-compensated fluid flow transducer.

FIG. 6 depicts a block diagram of a calibration station connected to an exemplary temperature-compensated fluid flow transducer. In this figure, a test setup 600 for calibrating an exemplary temperature-compensated fluid flow transducer 605 is depicted. The depicted fluid flow transducer 605 has a TCM 610, an amplifier 615, a feedback network 620, a fluid flow transducer 625, a signal processing circuit 630, and a processor 635. A tester 640 communicates with the temperature-compensated fluid flow transducer 605 over a bi-directional channel 645. The bi-directional channel 645 may be used to obtain measurements temperature-compensated fluid flow transducer 605. The bi-directional channel 645 may be used to calibrate the temperature-compensated fluid flow transducer 605 by programming various programmable elements. A TCM 610 may include one of the programmable elements to provide compensation for the fluid flow transducer 605. A programmable TCM 610 may permit improved system precision. A programmable TCM 610 may permit an expanded system dynamic range, for example.

Although various embodiments have been described with reference to the Figures, other embodiments are possible. For example, some embodiments may use multiple temperature sensors on either side of the heating element. The use of multiple temperature sensors may permit the fluid flow sensor to be accurate over a greater range of fluid flows, for example. In some embodiments, one or more temperature sensors may be distributed in an asymmetric fashion. For example, in one embodiment, only one temperature sensor may be located on the upstream side of a fluid flow transducer, but two or more temperature sensors may be located on the downstream side of the fluid flow transducer. Such a sensor may provide better precision, but only usable in a unidirectional flow scenario.

In various embodiments, a precision external current may be provided to the TCM. This precision current may be directed across a resistor to establish a temperature-compensating voltage for the system. In some embodiments, one or more DACs may be used to program the current or currents needed to generate the proper temperature-variation needed to compensate the system.

In accordance with an exemplary embodiment, a Micro ElectroMechanical Systems (MEMS) die may include a heating element configured to be substantially in direct thermal coupling with a fluid ambient. In some embodiments the MEMS die may include a first temperature sensor configured to be substantially in direct thermal coupling with the fluid ambient. In some embodiments the MEMS die may include a second temperature sensor configured to be substantially in direct thermal coupling with the fluid ambient, wherein the heating element may be located substantially between the first temperature sensor and the second temperature sensor, and wherein the heating element may be convectively coupled to the first temperature sensor and the second temperature sensor via the fluid ambient. In some embodiments the MEMS die may include a differential amplifier configured to receive a first signal output by the first temperature sensor and a second signal output by the second temperature sensor, the differential amplifier may have an output signal indicative of a flow of the fluid ambient, wherein the signal indicative of the flow of the fluid ambient may have a temperature disturbance. In some embodiments the MEMS die may include a heating-element bias circuit which may include a temperature-varying reference and an amplifier, the temperature-varying reference may have an output connected to an input of the amplifier, and wherein the temperature-varying reference output may vary in response to a substrate temperature of the MEMS die. In various embodiments the heating-element bias circuit may provide a temperature-varying bias that substantially compensates for the temperature disturbance of the signal indicative of the flow of the fluid ambient.

In accordance with an exemplary embodiment, a fluid flow sensor may include a Micro ElectroMechanical Systems (MEMS) microbridge flow sensor having a heater, a first temperature sensor, and a second temperature sensor, the heater located substantially between the first temperature sensor and the second temperature sensor. In some embodiments the fluid flow sensor may include a signal conditioner configured to receive a first signal from the first temperature sensor and a second signal from the second temperature sensor, the signal conditioner may have an output signal indicative of a flow of a fluid ambient, the output signal indicative of the flow of the fluid ambient may have a natural disturbance due to a temperature variation. In some embodiments the fluid flow sensor may include a bias generator having a temperature-varying output which is electrically connected to the heater, wherein the temperature-varying output may compensate for the natural disturbance due to the temperature variation. In some embodiments the fluid flow sensor may include means for biasing the heater such that the signal indicative of the flow of the fluid ambient may be substantially temperature-invariant. In accordance with some embodiments, the means for biasing the heater may include generating a temperature-varying signal. In various embodiments means for generating a temperature-varying signal may include providing an electronic component having a large temperature coefficient. In some embodiments means for generating a temperature-varying signal may include using a band-gap reference.

In various embodiments, a microbridge flow sensor may be manufactured on the same die as a bias generator. In some embodiments, the microbridge flow sensor may be located on a separate die from a die containing the bias generator. In an exemplary embodiment, the fluid flow sensor may be located on the same die as a signal conditioner. In another example, the fluid flow sensor may be located on a separate die from a die containing the signal conditioner. In some embodiments, the microbridge flow sensor, the bias generator, and the signal conditioner may all be manufactured on the same die.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A Micro ElectroMechanical Systems (MEMS) die, comprising:
a heating element configured to be substantially in direct thermal coupling with a fluid ambient;
a first temperature sensor configured to be substantially in direct thermal coupling with the fluid ambient;
a second temperature sensor configured to be substantially in direct thermal coupling with the fluid ambient, wherein the heating element is located substantially between the first temperature sensor and the second temperature sensor, and wherein the heating element is convectively coupled to the first temperature sensor and the second temperature sensor via the fluid ambient;
a differential amplifier configured to receive a first signal output by the first temperature sensor and a second signal output by the second temperature sensor, the differential amplifier having an output signal indicative of a flow of the fluid ambient, wherein the signal indicative of the flow of the fluid ambient has a temperature disturbance; and,
a heating-element bias circuit comprising a temperature-varying reference and an amplifier, the temperature-varying reference having an output connected to an input of the amplifier, and wherein the temperature-varying reference output varies in response to a substrate temperature of the MEMS die,
wherein the heating-element bias circuit provides a temperature-varying bias that substantially compensates for the temperature disturbance of the signal indicative of the flow of the fluid ambient.

2. The MEMS die of claim 1, wherein the heating-element bias circuit comprises a resistor having a magnitude of temperature coefficient of resistance greater than 1000 ppm/° C.

3. The MEMS die of claim 1, wherein the signal indicative of a flow of the fluid ambient has a temperature coefficient of less than 450 ppm/° C. for a measured flow of a predetermined full-scale.

4. The MEMS die of claim 1, further comprising a temperature sensor coupled to the MEMS die, the temperature sensor generating an output indicative of the substrate temperature of the MEMS die.

5. The MEMS die of claim 1, further comprising a gain/offset compensation circuit, wherein the gain/offset compensation circuit receives the signal indicative of the flow of the fluid ambient and generates an output indicative of the flow, the output calibrated to a predetermined reference standard.

6. The MEMS die of claim 1, wherein the output of the temperature-varying reference is programmable.

7. The MEMS die of claim 1, further comprising
a third temperature sensor; and,
a fourth temperature sensor,
wherein both the third temperature sensor and the fourth temperature sensor are configured to be substantially in direct thermal coupling with the fluid ambient,
wherein the heating element is located substantially between the third temperature sensor and the fourth temperature sensor, and
wherein the heating element is convectively coupled to the third temperature sensor and the fourth temperature sensor via the fluid ambient.

8. The MEMs die of claim 1, wherein the temperature-varying reference comprises a band-gap reference which generates a voltage that is Proportional To Absolute Temperature (PTAT).

9. The MEMs die of claim 1, wherein the temperature-varying reference is configured to be trimmed.

10. The MEMs die of claim 1, wherein the fluid ambient comprises a gaseous ambient.

11. A fluid flow sensor, comprising:
A Micro ElectroMechanical Systems (MEMS) microbridge flow sensor comprising a heater, a first temperature sensor, and a second temperature sensor, the heater located substantially between the first temperature sensor and the second temperature sensor;
a signal conditioner configured to receive a first signal from the first temperature sensor and a second signal from the second temperature sensor, the signal conditioner having an output signal indicative of a flow of a fluid ambient, the output signal indicative of the flow of the fluid ambient having a natural disturbance due to a temperature variation; and,
a bias generator having a temperature-varying output which is electrically connected to the heater, wherein the temperature-varying output compensates for the natural disturbance due to the temperature variation.

12. The fluid flow sensor of claim 11, wherein the signal indicative of the flow of the fluid ambient has a temperature coefficient of less than 450 ppm/° C. for a measured flow of a predetermined full-scale.

13. The fluid flow sensor of claim 11, wherein the MEMS microbridge flow sensor, the signal conditioner, and the bias generator are all manufactured on the same MEMs die.

14. The fluid flow sensor of claim 11, wherein the temperature-varying output of the bias generator is programmable.

15. The fluid flow sensor of claim 11, wherein the bias generator comprises a temperature-varying reference and an amplifier.

16. A fluid flow sensor, comprising:
   A Micro ElectroMechanical Systems (MEMS) microbridge flow sensor comprising a heater, a first temperature sensor, and a second temperature sensor, the heater located substantially between the first temperature sensor and the second temperature sensor;
   a signal conditioner configured to receive a first signal from the first temperature sensor and a second signal from the second temperature sensor, the signal conditioner having an output signal indicative of a flow of a fluid ambient, the output signal indicative of a flow of a fluid ambient having a natural disturbance due to a temperature variation; and,
   means for biasing the heater such that the signal indicative of the flow of the fluid ambient is substantially temperature-invariant.

17. The fluid flow sensor of claim 16, wherein means for biasing the heater comprises:
   means for generating a temperature-varying bias; and,
   means for electrically communicating the temperature-varying bias to the heater.

18. The fluid flow sensor of claim 16, wherein means for biasing the heater comprises:
   means for generating a temperature-varying reference, and a buffer.

19. The fluid flow sensor of claim 18, wherein means for generating a temperature-varying reference comprises:
   means for generating a current,
   a resistor with a magnitude of temperature coefficient of resistance greater than 1000 ppm/° C.

20. The fluid flow sensor of claim 18, wherein means for generating a temperature-varying reference comprises:
   means for generating a temperature-varying current,
   a MEMS based resistor.

* * * * *